INVENTORS
*HAROLD RAVNER*
*CHARLES H. BLACHLY*

BY
ATTORNEYS

{United States Patent Office}

3,372,981
Patented Mar. 12, 1968

3,372,981
STABILIZATION OF MONOETHANOLAMINE SOLUTIONS IN CARBON DIOXIDE SCRUBBERS
Harold Ravner, Accokeek, and Charles H. Blachly, West Hyattsville, Md., assignors to the United States of America as represented by the Secretary of the Navy
Filed Mar. 11, 1965, Ser. No. 439,110
2 Claims. (Cl. 23—4)

ABSTRACT OF THE DISCLOSURE

Aqueous monoethanolamine solutions which contain trace amounts of copper and iron compounds are used as absorber solutions for carbon dioxide in air purifying systems when stabilized to aeration-oxidation by the addition thereto of equal amounts of the monosodium salt of N,N-diethanolglycine and tetrasodium ethylenediamine tetraacetic acid which are in the range of from 4.8 to 8% by weight on the monoethanolamine content of the solutions.

---

The invention described herein may be manufactured and used by or for the Government of the United States of America for governmental purposes without the payment of any royalties thereon or therefor.

This invention relates to a method of stabilizing monoethanolamine to aeration-oxidation during use in aqueous solution as the absorbent in scrubbers for removal of carbon dioxide from the air-atmosphere of confined quarters, more particularly of nuclear submarines.

Aqueous monoethanolamine has the property of absorbing carbon dioxide from other gases, such as air and flue gas, under relatively cool conditions to form a solution containing amine carbonate and can be regenerated in whole or in part by heating the solution to release carbon dioxide therefrom.

A particular application of aqueous monoethanolamine (MEA) is in the purification of the atmosphere of nuclear submarines. In this application, the submarine is equipped with an apparatus known as a scrubber which consists essentially of an absorber (tower) which contains the aqueous MEA for removal of carbon dioxide from the air of the submarine and means including heat exchangers and a stripper (reboiler) for regeneration of the used MEA solution and for cooling the regenerated solution and recycling it to the absorber. In operation of the scrubber system, the atmosphere in the submarine is pumped through the absorption tower containing the aqueous MEA and the resulting amine carbonate-containing solution delivered to the heat exchangers which preheats it and then to the stripper where it is heated by boiling under pressure to cause release of carbon dioxide therefrom. This carbon dioxide is pumped overboard. The regenerated MEA solution is cooled by passing through appropriate heat exchangers and returned to the absorber for further removal of carbon dioxide from the atmosphere of the submarine. The process of absorbing, stripping, cooling and recycling is continued until the carbon dioxide content of the submarine's atmosphere has been reduced to an adequately lower level. The concentration of carbon dioxide in the atmosphere of nuclear submarines is maintained at about 1% by volume.

In the operation of the carbon dioxide scrubbers aboard nuclear submarines, it is at present customary to employ aqueous 4 N monoethanolamine solutions in the absorber. However, the concentration of MEA in the solutions may vary somewhat up or down from 4 normal which represents a practical concentration for the absorber operation. Addition of base stock MEA and of make up water to the absorber is not a precisely measured operation and the amounts added are subject somewhat to local practice aboard the submarine. In general, one could use concentrations of MEA in the scrubbers which range from about 3 to 5 normal and obtain a practicable removal of carbon dioxide from the submarine's atmosphere in operation of the scrubber system.

While aqueous monoethanolamine has been effective as an absorbent of carbon dioxide to improve the atmosphere of nuclear submarines, it has presented problems which derive from its lack of stability to oxidation under operating conditions normally encountered in the scrubbers. These problems are evolution of ammonia in noticeable amounts which cannot be tolerated in the ship's atmosphere, a rapid darkening in use, which interferes with the determinations of the normality of the solution by color indicator titrations, and a relatively short life as an absorbent which poses a logistics problem in supply of make-up absorber solution when the submarine is on extended patrol. In addition to ammonia, the products of the oxidative-degradation of the amine are peroxides and nonbasic nitrogen compounds which collect in the scrubber system.

In service, scrubber solutions are in contact with stainless steel from which the scrubbers and their components are fabricated and heated to temperatures which range from about 90° F. in the absorber to 280° F. in the stripper. In the absorber, the solution is in intimate contact with an abundance of air and, presumably, is close to saturation with respect to oxygen and carbon dioxide at the time it is drawn off to be cycled through the heat exchanger to the stripper. The only oxygen available to the MEA after it leaves the absorber is that carried in solution.

Oxidation of the carbonate-containing MEA solution occurs in all compartments of the scrubber system at rates which are dependent upon both temperature and air-oxygen supply. Despite the abundance of air-oxygen in the absorber, the reaction rate there is slow because of the relatively low temperature. As the used MEA solution is pumped to the stripper, the initial increase in rate of oxidation due to temperature rise is offset to an undetermined extent by depletion of the available oxygen in the solution.

We have found that scrubber solutions withdrawn from service in nuclear submarines have always contained trace amounts of copper and iron compounds, along with lesser amounts of nickel and chromium compounds. In the interest of brevity in expression, these compounds are hereinafter generally referred to in terms of the metal of the compound, i.e., as copper, iron, nickel and chromium. The copper in the scrubber solutions may range in amount from about 5 to 100 p.p.m. and the iron from about 5 to 120 p.p.m., with nickel and chromium being somewhat less and varying in amount from less than 1 p.p.m. to about 10 p.p.m.

Copper, chromium, iron and nickel are known to catalyze many oxidation processes. Accordingly, our investigations were directed toward evaluating compounds of these metals as sources of promotion of oxidation instability of aqueous MEA solutions in the scrubber systems of nuclear submarines. Our investigations have shown this to be the fact.

The source of the chromium, iron and nickel in the aqueous MEA scrubber solutions has not been pin-pointed. Conceivably, one source is the stainless steel which is the material of construction of the scrubbers and presumably, also, of much of the processing equipment for the MEA. Another possible source is debris from attrition of pump components and other moving parts of processing or operating equipment which could readily accumulate in both the base stock and operating MEA solutions.

Copper has been found in the base stock monoethanolamine. It has also been found in the make-up water for the scrubbers which is drawn from the potable water system of the submarine in which copper tubing is used. The steady build up of copper in scrubber solutions is caused in part by additions of make-up water and base stock MEA. Another source may be airborne copper fines which enter the solutions via the scrubber air inlet port.

The monosodium salt of N,N-diethanolglycine, hereinafter termed VFS, has been described in U.S. Patent 3,137,654 to Johnson, Lew and McElwain as a stabilizer for aqueous monoethanolamine in the scrubbers of nuclear submarines and is presently so used. It has also been proposed in this patent to employ tetrasodium ethylenediamine tetraacetic acid, hereinafter termed EDTA, as stabilizer for aqueous MEA in the scruber but it has not been used in practice.

We have investigated the capacity of VFS to stabilize aqueous monoethanolamine solutions against aeration-oxidation under bubbling of an air-$CO_2$ mixture through the MEA solution at a temperature (131° F.) which obtains in the nuclear submarine scrubber and found VFS to stabilize the MEA when the solution contains no metal or trace amounts of chromium and to afford a limited degree of stabilization when the solution contains trace amounts of iron or of nickel. We have further found, however, that when the MEA solution contains copper in trace amounts even as low as 1 p.p.m., VFS is not effective to stabilize the MEA against aeration-oxidation.

We have also investigated the stabilizing capacity of EDTA in aqueous monoethanolamine solutions under the same conditions as were employed for the VFS as stabilizer. We found EDTA to effectively stabilize the solution against aeration-oxidation when the solution contains trace amounts of copper, but not to be effective when the solution contains trace amounts of iron, and to provide about the same order of stabilization as VFS when trace amounts of nickel are present in the solution.

In view of the lack of capacity of VFS to stabilize aqueous monoethanolamine solutions to aeration-oxidation in the presence of carbon dioxide when traces of copper are present in the solutions and of EDTA when traces of iron are present therein, it became evident that a more versatile stabilizer was needed to ensure protection of the MEA solutions in the scrubbers of nuclear submarines, since, as we have found, the scrubber solutions of the submarines frequently contain copper and iron in trace amounts which promote aeration-oxidation of the monoethanolamine at temperatures prevailing in the scrubbers.

It is, therefore, a general object of the invention to improve the stability to aeration-oxidation of aqueous monoethanolamine solutions when functioning in a scrubber system for the removal of carbon dioxide from air.

It is a further object to provide an improved stabilizer for aqueous monoethanolamine solutions which are to be employed as the absorbent for removal of carbon dioxide from air atmospheres.

It is also an object to provide an improved scrubber process using an aqueous monoethanolamine solution as the absorbent for removing carbon dioxide from the air in the purification of the atmosphere of nuclear submarines.

The above and other objects of the invention are accomplished in accordance with our invention by the addition to the aqueous monoethanolamine solution, which may be of 4 normal strength, of equal proportions by weight of the monosodium salt of N,N-diethanolglycine (VFS) and tetrasodium ethylenediamine tetraacetic acid (EDTA), where the equal proportions may range from about 4.8 to 8% and preferably are about 6% by weight based on the weight of the monoethanolamine in the solutions.

The capacity of VFS and EDTA when used together in equal proportions as defined above to stabilize aqueous monoethanolamine solutions against aeration-oxidation in the scrubber of nuclear submarines is greater than that of either one of these additives and of the simple sum of their respective stabilizing capacities.

Our investigation of the aeration-oxidation of aqueous monoethanolamine solutions in the scrubbers of nuclear submarines were conducted under experimental conditions designed to simulate a variety of conditions of temperature and air-oxygen supply in the scrubbers since there is no one set of conditions of temperature and air-oxygen supply which completely describes the environment of the scrubber solution. The majority of the aeration tests were conducted in glass cells at 131° F. at which temperature the oxidation rate permitted convenient measurement of the reaction products. At temperatures much above 131° F., corrosive attack by the monoethanolamine on laboratory glassware was excessive and stainless steel cells were employed. The stainless steel of the cells was AISI Type 304 containing: Cr 18–20%, Ni 8–10%, Mn max. 2% and C. 08% max. Use of these cells had the additional advantage of permitting exposure of the sample MEA solutions to simulated scrubber wall conditions. The cells were maintained at temperature in a thermostatically-controlled water bath. All cells accommodated 300 ml. samples and were fitted with standard taper joints to accept water-cooled reflux condensers. Air, to which, unless otherwise indicated, 1% $CO_2$ by volume was added to approximate submarine atmosphere conditions, was bubbled through the sample solutions at an airflow rate of 1 cc. per ml. of solution per minute. The air-$CO_2$ mixture was admitted to the solution in the cells by means of a glass or stainless steel tube extending into and terminating near the bottom of the cell. Ammonia evolution was monitored by passing the effluent air through 2% by weight boric acid solutions which were periodically titrated with strong acid (HCl). Total nitrogen was determined by conventional Kjeldahl analysis, and peroxides by the iodine-thiosulfate method. Laboratory grade monoethanolamine which was redistilled and stored at 40° F. in evacuated sealed glass vials was used in the study.

In the accompanying drawing there are shown by way of illustration, curves which depict the activity of copper, iron, nickel and chromium in promoting oxidation of monoethanolamine during aeration of the solution with an air-carbon dioxide mixture at solution temperatures which obtain during operation of the carbon dioxide scrubbers in nuclear submarines and the activity in the solution of VFS and EDTA, separately, and in combination following the invention, to protect against the aeration-oxidation.

Figure 3:
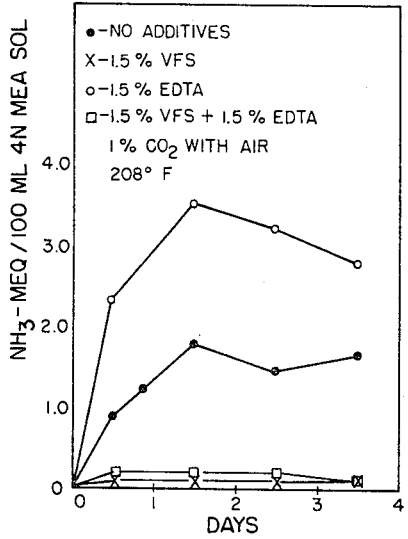
Figure 4:
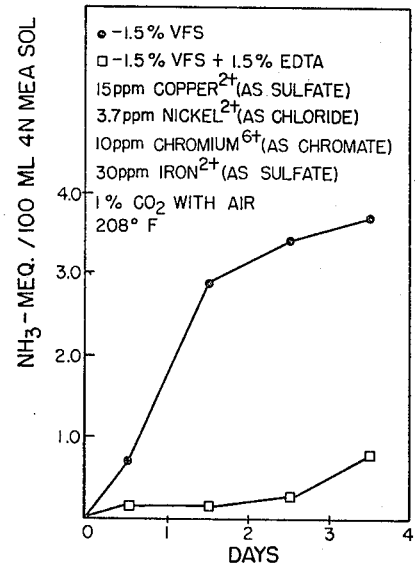

FIG. 3 is a series of curves depicting the activity of stainless steel in contact with an aqueous monoethanolamine solution containing, respectively, no added stabilizer, VFS and EDTA, separately, and VFS and EDTA together following the invention, while heating the solution to 208° F. and following air containing 1% $CO_2$ by volume through the heated solution, and FIG. 4 is a series of curves depicting the activity of iron, chromium, nickel and copper in the presence of VFS, alone, and in the presence of VFS with EDTA following the invention, in an aqueous monoethanolamine solution while heating the solution to 208° F. and flowing air containing 1% $CO_2$ by volume through the heated solution.

The presence of carbon dioxide in an air stream passed through an aqueous solution of monoethanolamine has a dramatic effect on the oxidation stability of the solution. When air free from carbon dioxide was passed through metal-free aqueous 4 N monoethanolamine solutions at 131° F. for several days, no preceptible degradation of the MEA was noticed. Addition of 1% $CO_2$ by volume to the air stream, however, resulted in almost instantaneous onset of degradation of the amine characterized by the evolution of ammonia, the generation of peroxide, the conversion of amine nitrogen to nonbasic forms, possibly cyclic condensation products, and gross discoloration of the sample fluid.

The capacity of VFS to function as an aeration-oxidation inhibitor for aqueous MEA solutions which contain iron or chrominum was determined at 131° F. by the above test procedure. Samples of aqueous 4 N MEA solutions were prepared which contained 1.5% VFS by weight in each instance and, respectively, 30 p.p.m. iron, added as ferrous sulfate; 30 p.p.m. iron, added as ferric chloride and 30 p.p.m. chromium, added as potassium chromate. Bubbling of the air-1% $CO_2$ mixture through the sample solutions in the glass cells was continued for a period of over 6 days.

As measured by the evolution of ammonia, deterioration of the MEA due to the added 30 p.p.m. of ferric iron was very small, while that due to the added 30 p.p.m. of ferrous iron was somewhat larger but nevertheless, of relatively low order. No deterioration of the solution occurred due to the added chromate.

Figure 1:
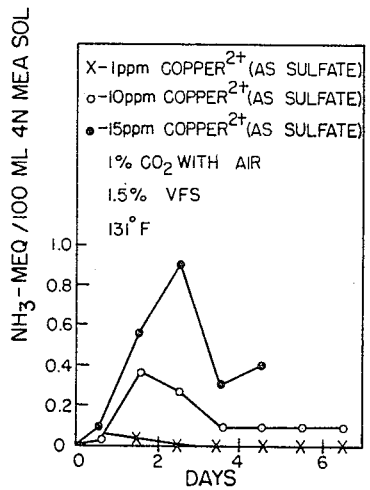
FIG. 1 is a series of curves depicting the activity of copper in the presence of VFS in an aqueous monoethanolamine solution while heating the solution to 131° F. and flowing air containing 1% $CO_2$ by volume through the heated solution.

Aqueous 4 N MEA sample solutions were made up to contain 1.5% of VFS by weight and, respectively, nickel and copper. The nickel was added in amounts of 3.7 p.p.m. and 37 p.p.m. and as nickelous sulfate and the copper in amounts of 1 p.p.m., 10 p.p.m. and 15 p.p.m. as cupric sulfate. The sample solutions were tested at 131° F. by the above procedure with bubbling of the air-1% $CO_2$ mixture therethrough for a period of over 6 days. No evolution of ammonia occurred in the case of the 3.7 p.p.m. of nickel. However, for the tenfold increase in concentration of the nickel, a rise in evolution of ammonia occurred comparable to that caused by the ferrous iron (above). However, the effect of copper in the solution on the stability of MEA is serious. In the presence of the VFS, even 1 p.p.m. of copper as cupric iron triggered the evolution of small, but perceptible quantities of ammonia and as the copper content was increased, up to 15 p.p.m., the effect was proportionately more serious, as appears from the curves in FIG. 1. At 15 p.p.m. content of copper, the rate of evolution of ammonia from the sample MEA solution rose sharply after the first half-day to a peak of approximately 0.9 meq. per 100 ml. of the 4 N MEA solution at the end of two and one-half days of the aeration period.

Figure 2:
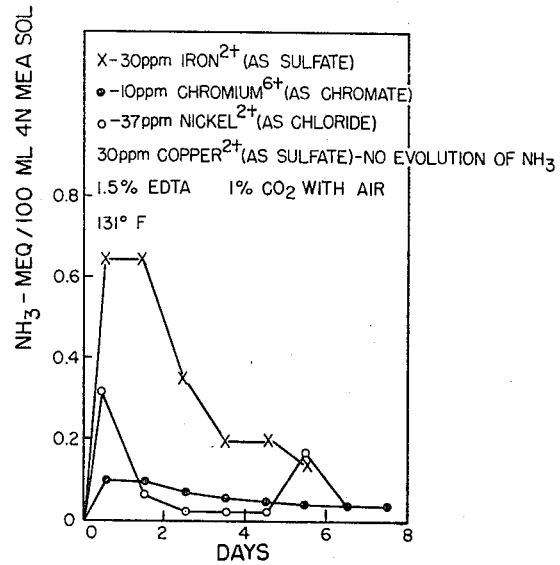
FIG. 2 is a series of curves depicting the activity of iron, chromium, nickel and copper in the presence of EDTA in an aqueous monoethanolamine solution while heating the solution to 131° F. and flowing air containing 1% $CO_2$ by volume through the heated solution.

Tetrasodium ethylenediamine tetraacetic acid (EDTA) was also evaluated as a stabilizer for aqueous MEA solutions at 131° F. by the above test procedure. Sample solutions of aqueous 4 N MEA were prepared, each containing 1.5% EDTA by weight and, respectively, 30 p.p.m. copper, added as cupric sulfate; 37 p.p.m. nickel, added as nickelous chloride; 10 p.p.m. chromium, added as potassium chromate and 30 p.p.m. iron, added as ferrous sulfate. In terms of ammonia evolution from the samples on aeration with the air-1% $CO_2$ mixture for a one-week period and as depicted in FIG. 2, the EDTA was effective for the 30 p.p.m. copper-containing solution, no ammonia having been evolved. However, for the solutions containing iron and chromium, respectively, EDTA was less effective than was VFS as a stabilizer under the same conditions. In the case of the iron, the rate of evolution of ammonia from the solution reached a peak of aproximately 0.625 meq. per 100 ml. of the 4 N MEA solution within the first half-day of the aeration period. With a content of 10 p.p.m. chromium, ammonia was evolved at a rate which reached approximately 0.32 meq. within the first half-day of the aeration period. With a content of 37 p.p.m. nickel, there was a lower rate of ammonia evolution which averaged less than 0.1 meq. for the one-week period.

The capacity of VFS and EDTA, individually, and, following the invention, of VFS and EDTA in combination to function as a stabilizer in aqueous monoethanolamine solutions in the presence of stainless steel at an intermediately higher temperature obtaining in the heating section of the stainless steel scrubber of a nuclear submarine was also determined by the test procedure described above, using the stainless steel cells and a test temperature of 208° F.

The samples were aqueous 4 N MEA solutions which contained no metals and, respectively, no stabilizer added and, by weight, 1.5% VFS; 1.5% EDTA and 1.5% VFS+1.5% EDTA. The samples were aerated in the stainless steel cells at 208° F. by bubbling the air-1% $CO_2$ by volume mixture through them for a period of three and one-half days. As depicted in FIG. 3, the rate of evolution of ammonia from the uninhibited MEA solution was high. The presence of the 1.5% EDTA in the solution resulted in no improvement in stability. The presence of the 1.5% VFS, on the other hand, provided a high order of stability. The presence of the combined 1.5% VFS and 1.5% EDTA in the solution gave no additional improvement in stability over the 1.5% VFS alone.

Like tests were conducted in the stainless steel cells at 208° F. but with the sample solutions of the aqueous 4 N MEA made up to contain 15 p.p.m. copper, added as cupric sulfate, 3.7 p.p.m. nickel, added as nickelous chloride, 10 p.p.m. chromium, added as potassium chromate, and 30 p.p.m. iron, added as ferrous sulfate, and respectively, 1.5% VFS and 1.5% VFS+1.5% EDTA by weight.

The results of the tests in the presence of the metals in the aqueous MEA solutions are depicted in FIG. 4. The excellent stabilizing effect of the VFS at 208° F. in the presence of stainless steel was completely nullified by the presence of the copper, nickel, chromium and iron. The rate of evolution of ammonia from the MEA solution accelerated to an intermediate high peak of 2.9 meq. within the first day and a half of the test period and to a higher level within the next two days. The combination of the VFS and EDTA resulted in a substantial improvement in the stability of the MEA in the solution containing the metal salts, more than could have been reasonably predicted from the sum of their individual stabilizing contributions. The rate of evolution of ammonia from the MEA solution for the combined stabilizer additives was relatively low for the high temperature of 208° F. over the three and one-half day test period.

The capacity of VFS and EDTA in combination in the aqueous monoethanolamine to stabilize the amine under conditions obtaining in the carbon dioxide scrubber of a nuclear submarine was demonstrated when an aqueous 4 N monoethanolamine solution modified to contain 1.5% VFS and 1.5% EDTA by weight following the invention and the like MEA solution containing only the 1.5% VFS by weight were submitted to a sea trial in twin scrubbers in a nuclear submarine. In the absence aboard the submarine of equipment for measuring ammonia evolution, the evaluation of the capacity of the stabilizer additives in the respective solutions in the scrubbers was made on the basis of the amount of the nonbasic nitrogen compounds produced during the period of operation of the scrubbers to purify the atmosphere of the submarine by absorption of $CO_2$ therefrom.

The scrubbers were made of stainless steel, with some of the parts being made of AISI Type 304 and the rest of AISI Type 316 stainless steel. Type 316 contains Cr 18–20%, Ni 8–12%; Mn 2% max., C .08% max. The scrubbers had an absorption tower, heat exchangers and a pressure operated reboiler, with the necessary tubing and pumps for recycling of the solution therein.

A total of about 44 gallons of the aqueous MEA solution was filled into each of the twin scrubbers. The MEA solution containing the VFS was filled into the one scrubber and the solution containing the VFS+EDTA into the other. The absorption tower in the scrubbers was operated at about 90° F. and the reboiler, which is operated under pressure, at about 280° F. The test period was for 300 hours. The average $CO_2$ content of the atmosphere of the submarine was about 1% by volume.

Samples of the scrubber solutions were periodically withdrawn and observed for color and analyzed for total nitrogen to determine the extent of development of nonbasic nitrogen compounds in the solutions by aeration-oxidation of the monoethanolamine. The scrubber solution containing VFS, only, gave evidence of the presence therein of nonbasic nitrogen compounds in its initial sojourn in the absorption tower, whereas the scrubber solution containing both VFS and EDTA had an induction period of about 100 hours before nonbasic nitrogen compounds were found to be present therein. At the end of the test period, the level of nonbasic nitrogen compounds in the scrubber solution containing VFS was substantially higher than that of the scrubber solution containing both VFS and EDTA.

While in the above description we have described the invention with reference to certain specific embodiments thereof, it is intended that they shall be taken by way of illustration and not in limitation except as may be defined in the appended claims.

What is claimed is:

1. In the method of purifying air through absorption of carbon dioxide therefrom in an aqueous monoethanolamine solution contained in a carbon dioxide scrubber which has an absorber section in cyclic fluid flow communication with a stripper section and in said method the air to be purified is flowed through the aqueous monoethanolamine solution in the absorber section and carbon dioxide absorbed from the air in said solution, the resulting solution is flowed from the absorber section to the stripper section and heated in the stripper section to a temperature above its normal boiling point up to about 280° F. to release carbon dioxide therefrom and regenerate, at least in part, the aqueous monoethanolamine solution, said regenerated solution is cooled and returned to said absorber section for further absorption of carbon dioxide from air and wherein, further, said aqueous monoethanolamine solution contains trace amounts of copper and iron compounds which promote oxidation of the monoethanolamine, the improvement which comprises employing in said scrubber an aqueous monoethanolamine solution to which has been added an equal proportion by weight of the monosodium salt of N,N-diethanolglycine and of tetrasodium ethylenediamine tetraacetic acid which is in the range of from about 4.8 to 8% by weight on the weight of the monoethanolamine in the solution.

2. In the method as defined in claim 1, employing in said scrubber an aqueous monoethanolamine solution to which has been added an equal proportion of the monosodium salt of N,N-diethanolglycine and of tetrasodium ethylenediamine tetraacetic acid which is about 6% by weight on the weight of the monoethanolamine in the solution.

References Cited

UNITED STATES PATENTS 3,137,654  6/1964  Johnson et al. _____ 252—187

LEON D. ROSDOL, *Primary Examiner.*

S. D. SCHWARTZ, *Assistant Examiner.*